Oct. 26, 1937.    W. P. VENZKE    2,097,313
INDICATING SYSTEM
Original Filed Aug. 17, 1934
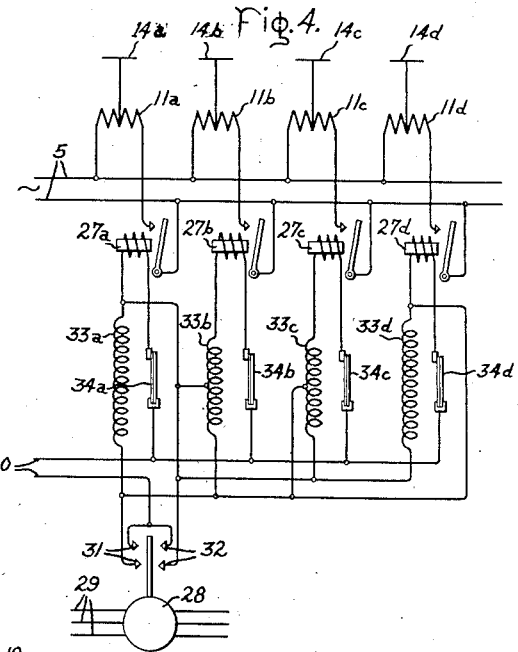
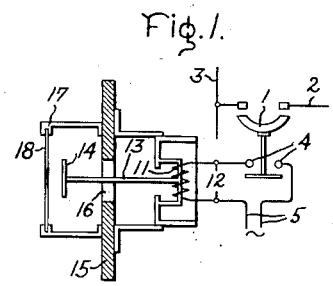
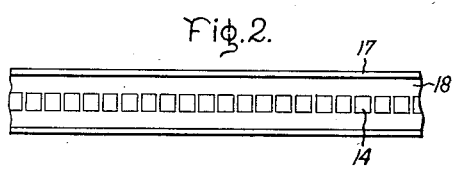
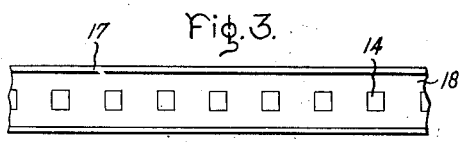
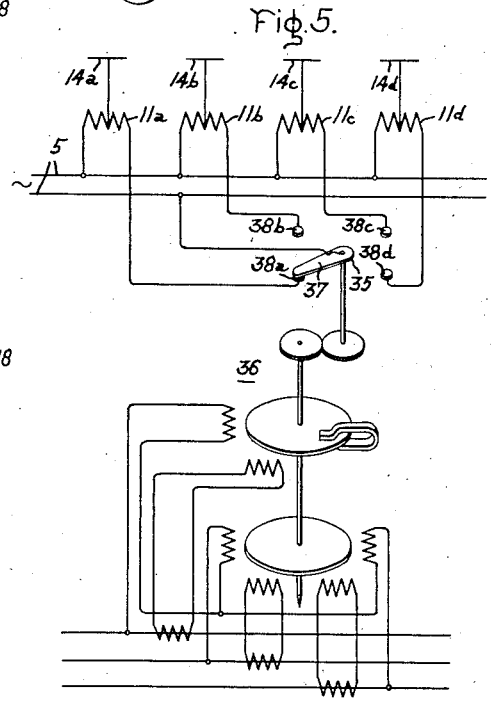
Inventor:
Walter P. Venzke,
by Harry E. Dunham
His Attorney.

Patented Oct. 26, 1937

2,097,313

UNITED STATES PATENT OFFICE 2,097,313

INDICATING SYSTEM

Walter P. Venzke, Berlin N. 65, Germany, assignor to General Electric Company, a corporation of New York Original application August 17, 1934, Serial No. 740,319. Divided and this application April 15, 1937, Serial No. 137,070. In Germany September 7, 1933

4 Claims. (Cl. 177—311)

This application is a division of my copending application Serial No. 740,319, filed August 17, 1934.

My invention relates to indicating systems and concerns particularly arrangements for use in electric control stations to indicate the positions of switches or other movable parts in an electrical distribution system.

It is an object of my invention to provide an arrangement for displaying at any time a symbolic picture of the varying conditions of operation as well as the positions of switches in distribution networks.

It is a further object of my invention to provide such an arrangement which may be readily constructed at relatively little cost and in which the consumption of current and the production of waste heat will be reduced to a minimum.

Still another object is the provision of an indicating system in which the indications may be clearly and easily read.

It is also an object of my invention to provide directional indications representative of the flow of a medium such as electricity or a material conveyed in pipes.

In accordance with my invention in its preferred form, vibrating reed indicating elements are utilized for producing the position indications. The individual indicating elements may be used in conjunction with lines marked on a panel in the form of a diagram representing the conductors or the power lines in a distribution network. However, this divisional application relates particularly to arrangements in which the appearance of a line is produced by the vibrating targets, themselves, of a plurality of indicating elements. The vibrating reed elements may be so arranged that targets carried by the vibrating reeds move either at right angles to or along lines representing the electrical network for the purpose of producing the illusion of live sections of line representing feeders connected to main buses or line sections energized by the closing of switches in various portions of a power line or bus.

The lines of the diagram may be produced wholly or in part by the targets of a number of adjacent vibrating reed elements for the purpose either of producing the illusion of a broadened line to represent a live section of a network or for the purpose of changing a broken line representing a dead section into a series of connected line segments to represent a live section of the network.

The direction of flow of a flowing medium or the direction of power transfer in an electric system may also be represented symbolically by using the targets of a series of adjacent vibrating reed elements to represent a pipe line or electric power line and causing the vibrating reed elements to be energized in succession to produce the illusion of flow by the successive vibration of the targets along the line of targets in a direction corresponding to the direction of flow or power transfer.

The features of my invention which I believe to be novel and patentable will be pointed out in the claims appended hereto. A better understanding of my invention, itself, however, may be obtained by referring to the following description taken in connection with the accompanying drawing in which Fig. 1 represents schematically in a side view one of the vibrating reed elements and shows in cross section a fragment of the panel or indicating board on which the vibrating reed element is mounted. Figs. 2 and 3 illustrate fragments of indicating panels constructed in accordance with two embodiments of my invention, Fig. 2 showing an arrangement in which the reeds are intended to vibrate transversely to the line in which their targets are located and Fig. 3 showing an arrangement in which the reeds are intended to vibrate along the line in which their targets are located when at rest. Figs. 4 and 5 are circuit diagrams of arrangements for producing directional indications.

Referring now more in detail to the drawing in which like reference characters designate like parts throughout, in Fig. 1, the vibrating reed element is represented as consisting of an exciting winding 11 energized through a control circuit connected at the terminals 12. A vibrating reed 13 is set in motion by the energization of the exciting winding 11 and a target 14 is carried on the end of the reed 13 to permit easy detection of the vibration of the reed 13. The vibrating reed element may be similar to such elements of a well known type used in vibrating reed frequency meters and, therefore, need not be described in detail.

I have found it satisfactory to mount the vibrating reed elements on the back of a panel, such as the panel 15, with each vibrating reed 13 projecting through an opening 16 in the panel so that the target 14 is positioned in front of the face of the panel 15. However, it will be understood that I am not limited to this precise construction and might, if desired, also arrange the target 14 to vibrate flush with the surface of panel 15 or in a recess. In the arrangement illustrated with the target 14 positioned in front of the panel 15, a channel 17 is provided preferably having a transparent front plate 18 to protect the vibrating elements and composed of any suitable material such as glass, synthetic resin, or the like.

To simulate the conductors of an electrical network or the pairs or groups of conductors forming an electric transmission line, a plurality of vibrating-reed elements are placed in a row with their targets 14 in line. It will be understood that, owing to the high frequency of vibration of the targets 14, elongated or extended images of them are produced and they appear to the eye as continuous lines or line segments as in the case of vibrating reed frequency meter elements.

Suitable control circuits are, of course, to be provided for simultaneously energizing reed windings 11 and operating the switches simulated or for energizing the reed windings in response to operation of the switches. Such circuits, however, are not part of my invention and need not, therefore, be described in detail. For example, in Fig. 1, if the vibrating reed elements are intended to simulate a feeder circuit 2 adapted to be connected by a circuit breaker 1 to a bus 3, the circuit breaker 1 may provided with an auxiliary set of contacts 4 serving to close a circuit from an auxiliary alternating-current source 5 through the reed-actuating windings 11 when the circuit breaker 1 assumes its closed position, thereby setting the reeds 13 in vibration.

The vibrating reed element illustrated in Fig. 1 may be so arranged that the targets 14 vibrate either transversely to the line in which they are located when at rest as in Fig. 2, or in the same direction as in Fig. 3. In the arrangement of Fig. 2, the narrow line composed of targets at rest represents a dead portion of the network and a broad line produced by vibrating targets might represent a live portion of the network.

If the targets in the arrangement illustrated in Fig. 3 are arranged to vibrate longitudinally, an illusion of a continuous line will be produced when the vibrating elements are energized and the broken line represented by targets at rest may represent a dead portion of a network. The continuous line represented by the vibrating targets may represent a live portion of the network.

My invention is not limited merely to indicating the positions of switches or other movable elements of an electrical network or to indicating whether sections of a network are alive or dead but may also be adapted to the production of other indications, for example, an indication of the direction in which power is flowing or being transferred in an electrical system. For example, if a power line simulating diagram is made up of a plurality of vibration elements, as illustrated in Figs. 2 and 3, the vibrating elements may be arranged to be energized progressively from one end of the diagram to the other instead of simultaneously for the purpose of producing an illusion of flow. Obviously, the successive vibrations of the targets 14 along the line of targets would produce a very effective symbol of power flow.

Any suitable method may be employed for energizing the vibrating reed elements progressively. For example, as illustrated in Fig. 4, each of the elements may be connected through a control circuit to an inductance and the inductances may be given progressively increasing values in order to cause each element to have a different time lag of response, in this way causing the vibrations to take place progressively.

In the arrangement shown in Fig. 4, a plurality of vibrating reed elements 14a, 14b, 14c, and 14d have their actuating windings 11a, 11b, 11c, and 11d connected to an auxiliary source of alternating current 5 through the contacts of a set of relays 27a to 27d which, in turn, are controlled by a power directional relay 28 responsive to the direction of power transfer in a three-phase transmission line 29. The windings of the relays 27a to 27d are connected to a source of auxiliary current 30 through one or the other of alternative pairs of contacts 31 and 32 of the power direction relay 28 and through inductances 33a to 33d, varying in value, inductances 33a and 33d being of greater value than inductances 33b and 33c.

Preferably, relays 34a to 34d, adapted to permit current to flow only a predetermined length of time and then restore the circuit again after another predetermined duration of circuit interruption, are also connected in series with the windings 27a to 27d. The relays 34a to 34d, for example, may be of the bimetallic thermostatic strip type which become heated after current has flowed a predetermined length of time, bending away from the stationary contacts to open the circuit and then being cooled to close the circuit again after another predetermined length of time.

When the direction of power transfer is such that the power directional relay 28 closes its contacts 32, the relay 27a will be connected directly through a source 30 to thermostatic relay 34a and vibrating reed element 14a will be set in vibration, continuing to vibrate until the relay 34a opens. A circuit will also be closed through winding 27b, the upper half of inductance 33b, and thermostatic relay 34b to the source 30. Owing to the inductance in the circuit, the closing of relay 27b will be later than the closing of relay 27a, and vibrating reed element 14b will start vibrating slightly later than element 14a but will vibrate for the same period of time as the element 14a. In a similar manner, relay 27c, connected through the inductance 33c will be further delayed, and relay 27d, connected through inductance 33d of greater value, will be still further delayed. Consequently, the vibrating reed elements 14a to 14d will be set in vibration progressively and successive waves of vibration will appear to travel down the row of vibrating reed elements to indicate the direction of power transfer. If the direction of power transfer reverses so as to close the contacts 31 instead of the contacts 32, the relay 27d will, of course, be directly connected to the source 30 without any inductance in the circuit and the relays 27c, 27b, and 27a will be connected through successively increasing amounts of inductance to reverse the order in which the vibrating reed elements 14a to 14d are actuated.

The vibrating reed elements may also be progressively actuated in a direction dependent upon the direction of power transfer by means of a rotary switch 35 (Fig. 5) driven by a power directional relay 36 of the inductance disk motor type, which is well known and need not be described in detail. The moving blade 37 of the rotary switch 35 progressively engages the stationary contacts 38a, 38b, 38c, and 38d to close circuits progressively through the reed-actuating windings 11a to 11d. Upon reversal in direction of power transfer, the direction of rotation of the motor 36 and the switch blade 37 reverses. While I have described specific arrangements for progressively actuating vibrating reed elements, it will be understood that I am not limited to the exact arrangements which I have disclosed.

Although my invention is particularly well adapted to use with electrical networks, it will be understood, of course, that it is not limited thereto but may also be used for the symbolic indication of conditions of operation in other systems having a flowing medium. For example, in water or gas distributing systems, the direction of flow may be represented by causing the vibrating reeds to be energized progressively as previously explained.

If desired, transient conditions in electrical networks may be represented by flicker indications similar to the flicker lights used in luminous line diagrams by energizing the vibrating reed elements with intermittent alternating current or by using alternating current modulated with another frequency. For example, a relay actuated by transient currents may be utilized to connect vibrating reed elements to a source of intermittent alternating current upon the occurrence of a transient.

Obviously, high precision is not required in the manufacture of the reed elements, since the vibrating reeds may be broadly tuned to any frequency near the frequency of the current source, for example, from 59.5 to 60.5 cycles for 60 cycle systems.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A circuit-continuity indicator comprising in combination, a plurality of substantially parallel vibrating reeds having targets in line, and means for setting said reeds in vibration in the same plane when a circuit to be indicated has been made continuous, thereby producing, owing to persistence of vision, an illusion of a plurality of line segments joined to form a continuous line, said reeds remaining at rest when the continuity of said circuit is broken, thereby leaving a plurality of targets forming a broken line indicating interruption of the circuit.

2. A circuit-continuity indicator comprising in combination, a plurality of vibrating reeds carrying targets and having means deenergized when the continuity of a circuit to be indicated has been interrupted and for setting said reeds in vibration when the circuit has been made continuous, thereby producing an illusion of a plurality of adjacent line segments cooperating to produce a figure representing the continuity of said circuit, said reeds being broadly responsive to impulses of like frequency.

3. A flow-direction indicator comprising in combination, a plurality of vibrating reed elements arranged in a line having targets adapted to vibrate, and means for progressively energizing said vibrating reed elements from one end of the line to the other in the direction representing the direction of flow, thereby setting said targets in vibration progressively to produce the illusion of flow along the line of targets representing the line of flow.

4. A circuit-continuity indicator comprising in combination, a plurality of substantially parallel vibrating reed indicators having targets arranged in a line and means for vibrating said reeds in substantially parallel planes transverse to the direction of said line when said circuit is in the condition of continuity to produce the illusion of a broad line representing a flow through said circuit when said targets are in vibration and to leave a narrow line of the width of the targets to represent interruption of flow when said targets are at rest.

WALTER P. VENZKE.